US008456791B2

(12) United States Patent
Jones et al.

(10) Patent No.: US 8,456,791 B2
(45) Date of Patent: Jun. 4, 2013

(54) RF COAXIAL SURGE PROTECTORS WITH NON-LINEAR PROTECTION DEVICES

(75) Inventors: Jonathan L. Jones, Carson City, NV (US); Chris Penwell, Minden, NV (US)

(73) Assignee: Transtector Systems, Inc., Hayden, ID (US)

( * ) Notice: Subject to any disclaimer, the term of this patent is extended or adjusted under 35 U.S.C. 154(b) by 481 days.

(21) Appl. No.: 12/897,658

(22) Filed: Oct. 4, 2010

(65) Prior Publication Data

US 2011/0080683 A1 Apr. 7, 2011

Related U.S. Application Data

(60) Provisional application No. 61/248,334, filed on Oct. 2, 2009.

(51) Int. Cl.
*H02H 9/00* (2006.01)

(52) U.S. Cl.
USPC .......................................................... 361/119

(58) Field of Classification Search
USPC .......................................................... 361/119
See application file for complete search history.

(56) References Cited

U.S. PATENT DOCUMENTS

| | | | |
|---|---|---|---|
| 2,030,179 | A | 2/1936 | Potter |
| 3,167,729 | A | 1/1965 | Hall |
| 3,323,083 | A | 5/1967 | Ziegler |
| 3,619,721 | A | 11/1971 | Westendorp |
| 3,663,901 | A | 5/1972 | Forney, Jr. |
| 3,731,234 | A | 5/1973 | Collins |
| 3,750,053 | A | 7/1973 | LeDonne |
| 3,783,178 | A | 1/1974 | Philibert |
| 3,831,110 | A | 8/1974 | Eastman |
| 3,845,358 | A | 10/1974 | Anderson et al. |
| 3,944,937 | A | 3/1976 | Fujisawa et al. |
| 3,980,976 | A | 9/1976 | Tadama et al. |
| 4,046,451 | A | 9/1977 | Juds et al. |
| 4,047,120 | A | 9/1977 | Lord et al. |
| 4,112,395 | A | 9/1978 | Seward |
| 4,262,317 | A | 4/1981 | Baumbach |
| 4,359,764 | A | 11/1982 | Block |
| 4,384,331 | A | 5/1983 | Fukuhara et al. |
| 4,409,637 | A | 10/1983 | Block |

(Continued)

FOREIGN PATENT DOCUMENTS

| | | |
|---|---|---|
| CH | 675933 A5 | 11/1990 |
| JP | 11-037400 | 2/1999 |

(Continued)

*Primary Examiner* — Stephen W Jackson
(74) *Attorney, Agent, or Firm* — Snell & Wilmer LLP

(57) ABSTRACT

An apparatus for protecting hardware devices is disclosed. A DC pass RF surge suppressor includes a housing defining a chamber having a central axis, the housing having an opening to the chamber, an input conductor disposed in the chamber of the housing and extending substantially along the central axis of the chamber, an output conductor disposed in the chamber of the housing and extending substantially along the central axis of the chamber, a non-linear protection device positioned in the opening of the housing for diverting surge energy to a ground, a capacitor connected in series with the input conductor and the output conductor, a first spiral inductor having an inner edge connected to the input conductor and an outer edge coupled to the non-linear protection device, and a second spiral inductor having an inner edge connected to the output conductor and an outer edge coupled to the non-linear protection device.

18 Claims, 25 Drawing Sheets

U.S. PATENT DOCUMENTS

| | | | | |
|---|---|---|---|---|
| 4,481,641 | A | 11/1984 | Gable et al. | |
| 4,554,608 | A | 11/1985 | Block | |
| 4,563,720 | A | 1/1986 | Clark | |
| 4,586,104 | A | 4/1986 | Standler | |
| 4,689,713 | A | 8/1987 | Hourtane et al. | |
| 4,698,721 | A | 10/1987 | Warren | |
| 4,727,350 | A | 2/1988 | Ohkubo | |
| 4,841,253 | A * | 6/1989 | Crabill | 330/277 |
| 4,864,250 | A * | 9/1989 | Bacon | 330/277 |
| 4,952,173 | A | 8/1990 | Peronnet et al. | |
| 4,984,146 | A | 1/1991 | Black et al. | |
| 4,985,800 | A | 1/1991 | Feldman et al. | |
| 5,053,910 | A | 10/1991 | Goldstein | |
| 5,057,964 | A | 10/1991 | Bender et al. | |
| 5,102,818 | A | 4/1992 | Paschke et al. | |
| 5,122,921 | A | 6/1992 | Koss | |
| 5,124,873 | A | 6/1992 | Wheeler et al. | |
| 5,142,429 | A | 8/1992 | Jaki | |
| 5,166,855 | A | 11/1992 | Turner | |
| 5,278,720 | A | 1/1994 | Bird | |
| 5,321,573 | A | 6/1994 | Person et al. | |
| 5,353,189 | A | 10/1994 | Tomlinson | |
| 5,442,330 | A | 8/1995 | Fuller et al. | |
| 5,537,044 | A | 7/1996 | Stahl | |
| 5,617,284 | A | 4/1997 | Paradise | |
| 5,625,521 | A | 4/1997 | Luu | |
| 5,667,298 | A | 9/1997 | Musil et al. | |
| 5,721,662 | A | 2/1998 | Glaser et al. | |
| 5,781,844 | A | 7/1998 | Spriester et al. | |
| 5,790,361 | A | 8/1998 | Minich | |
| 5,844,766 | A | 12/1998 | Miglioli et al. | |
| 5,854,730 | A | 12/1998 | Mitchell et al. | |
| 5,953,195 | A | 9/1999 | Pagliuca | |
| 5,966,283 | A | 10/1999 | Glaser et al. | |
| 5,982,602 | A | 11/1999 | Tellas et al. | |
| 5,986,869 | A | 11/1999 | Akdag | |
| 6,054,905 | A | 4/2000 | Gresko | |
| 6,060,182 | A | 5/2000 | Tanaka et al. | |
| 6,061,223 | A | 5/2000 | Jones et al. | |
| 6,086,544 | A | 7/2000 | Hibner et al. | |
| 6,115,227 | A | 9/2000 | Jones et al. | |
| 6,137,352 | A | 10/2000 | Germann | |
| 6,141,194 | A | 10/2000 | Maier | |
| 6,177,849 | B1 | 1/2001 | Barsellotti et al. | |
| 6,236,551 | B1 | 5/2001 | Jones et al. | |
| 6,243,247 | B1 | 6/2001 | Akdag et al. | |
| 6,252,755 | B1 | 6/2001 | Willer | |
| 6,281,690 | B1 | 8/2001 | Frey | |
| 6,292,344 | B1 | 9/2001 | Glaser et al. | |
| 6,342,998 | B1 | 1/2002 | Bencivenga et al. | |
| 6,381,283 | B1 | 4/2002 | Bhardwaj et al. | |
| 6,385,030 | B1 | 5/2002 | Beene | |
| 6,394,122 | B1 | 5/2002 | Sibley et al. | |
| 6,421,220 | B2 | 7/2002 | Kobsa | |
| 6,502,599 | B1 | 1/2003 | Sibley et al. | |
| 6,527,004 | B1 | 3/2003 | Sibley et al. | |
| 6,721,155 | B2 | 4/2004 | Ryman | |
| 6,754,060 | B2 | 6/2004 | Kauffman | |
| 6,757,152 | B2 | 6/2004 | Galvagni et al. | |
| 6,785,110 | B2 | 8/2004 | Bartel et al. | |
| 6,789,560 | B1 | 9/2004 | Sibley et al. | |
| 6,814,100 | B1 | 11/2004 | Sibley et al. | |
| 6,968,852 | B1 | 11/2005 | Sibley | |
| 6,975,496 | B2 | 12/2005 | Jones et al. | |
| 7,082,022 | B2 | 7/2006 | Bishop | |
| 7,104,282 | B2 | 9/2006 | Hooker et al. | |
| 7,106,572 | B1 | 9/2006 | Girard | |
| 7,130,103 | B2 | 10/2006 | Murata | |
| 7,159,236 | B2 | 1/2007 | Abe et al. | |
| 7,215,221 | B1 * | 5/2007 | Ellis et al. | 333/125 |
| 7,221,550 | B2 | 5/2007 | Chang et al. | |
| 7,250,829 | B2 | 7/2007 | Namura | |
| 7,430,103 | B2 | 9/2008 | Kato | |
| 7,623,332 | B2 | 11/2009 | Frank et al. | |
| 7,808,752 | B2 | 10/2010 | Richiuso et al. | |
| 2002/0167302 | A1 | 11/2002 | Gallavan | |
| 2002/0191360 | A1 | 12/2002 | Colombo et al. | |
| 2003/0072121 | A1 | 4/2003 | Bartel et al. | |
| 2003/0211782 | A1 | 11/2003 | Esparaz et al. | |
| 2004/0121648 | A1 | 6/2004 | Voros | |
| 2004/0145849 | A1 | 7/2004 | Chang et al. | |
| 2004/0264087 | A1 | 12/2004 | Bishop | |
| 2005/0036262 | A1 | 2/2005 | Siebenthall et al. | |
| 2005/0044858 | A1 | 3/2005 | Hooker et al. | |
| 2005/0176275 | A1 | 8/2005 | Hoopes et al. | |
| 2005/0185354 | A1 | 8/2005 | Hoopes | |
| 2006/0146458 | A1 | 7/2006 | Mueller | |
| 2007/0053130 | A1 | 3/2007 | Harwath | |
| 2007/0139850 | A1 | 6/2007 | Kamel et al. | |
| 2009/0103226 | A1 | 4/2009 | Penwell et al. | |
| 2009/0109584 | A1 | 4/2009 | Jones et al. | |
| 2009/0284888 | A1 | 11/2009 | Bartel et al. | |
| 2011/0080683 | A1 | 4/2011 | Jones et al. | |
| 2011/0141646 | A1 | 6/2011 | Jones et al. | |
| 2011/0159727 | A1 | 6/2011 | Howard et al. | |

FOREIGN PATENT DOCUMENTS

| | | |
|---|---|---|
| KR | 1020090018497 | 2/2009 |
| WO | WO 9510116 | 4/1995 |
| WO | PCT/US03/017050 | 5/2003 |
| WO | WO 2011-119723 | 12/2011 |

* cited by examiner

RF COAXIAL SURGE PROTECTORS WITH NON-LINEAR PROTECTION DEVICES

CROSS-REFERENCE TO RELATED APPLICATION

The present application for patent claims priority from and the benefit of U.S. provisional application No. 61/248,334 entitled "DC PASS RF COAXIAL SURGE PROTECTORS WITH NON-LINEAR PROTECTION DEVICES," filed on Oct. 2, 2009, which is expressly incorporated herein by reference.

BACKGROUND

1. Field

The present invention generally relates to surge protectors and more particularly relates to DC pass or DC short RF coaxial surge protectors with non-linear protection devices.

2. Background

Communications equipment, computers, home stereo amplifiers, televisions, and other electronic devices are increasingly manufactured using small electronic components which are very vulnerable to damage from electrical energy surges. Surge variations in power and transmission line voltages, as well as noise, can change the operating range of the equipment and can severely damage and/or destroy electronic devices. Moreover, these electronic devices can be very expensive to repair and replace. Therefore, a cost effective way to protect these components from power surges is needed.

There are many sources which can cause harmful electrical energy surges. One source is radio frequency (RF) interference that can be coupled to power and transmission lines from a multitude of sources. The power and transmission lines act as large antennas that may extend over several miles, thereby collecting a significant amount of RF noise power from such sources as radio broadcast antennas. Another source of the harmful RF energy is from the equipment to be protected itself, such as computers. Older computers may emit significant amounts of RF interference. Another harmful source is conductive noise, which is generated by equipment connected to the power and transmission lines and which is conducted along the power lines to the equipment to be protected. Still another source of harmful electrical energy is lightning. Lightning is a complex electromagnetic energy source having potentials estimated from 5 million to 20 million volts and currents reaching thousands of amperes.

Ideally, what is desired in a DC pass or DC short RF surge suppression device is having a compact size, a low insertion loss, and a low voltage standing wave ratio (VSWR) that can protect hardware equipment from harmful electrical energy emitted from the above described sources.

SUMMARY

An apparatus for protecting hardware devices is disclosed. A DC pass RF surge suppressor includes a housing defining a chamber having a central axis, the housing having an opening to the chamber, an input conductor disposed in the chamber of the housing and extending substantially along the central axis of the chamber, an output conductor disposed in the chamber of the housing and extending substantially along the central axis of the chamber, a non-linear protection device positioned in the opening of the housing for diverting surge energy to a ground, a capacitor connected in series with the input conductor and the output conductor, a first spiral inductor having an inner edge connected to the input conductor and an outer edge coupled to the non-linear protection device, and a second spiral inductor having an inner edge connected to the output conductor and an outer edge coupled to the non-linear protection device.

A DC short RF surge suppressor includes a housing defining a chamber having a central axis, an input conductor disposed in the chamber of the housing and extending substantially along the central axis of the chamber, an output conductor disposed in the chamber of the housing and extending substantially along the central axis of the chamber, a capacitor connected in series with the input conductor and the output conductor, a first spiral inductor having an inner edge connected to the input conductor and an outer edge coupled to the housing, and a second spiral inductor having an inner edge connected to the output conductor and an outer edge coupled to the housing.

A further understanding of the nature and advantages of the invention herein may be realized by reference to the remaining portions of the specification and the attached drawings.

DETAILED DESCRIPTION

In the description that follows, the present invention will be described in reference to a preferred embodiment that operates as a surge suppressor. In particular, examples will be described which illustrate particular features of the invention. The present invention, however, is not limited to any particular features nor limited by the examples described herein. Therefore, the description of the embodiments that follow are for purposes of illustration and not limitation.

Surge protectors protect electronic equipment from being damaged by large variations in the current and voltage across power and transmission lines resulting from lightning strikes, switching surges, transients, noise, incorrect connections, and other abnormal conditions or malfunctions. Large variations in the power and transmission line currents and voltages can change the operating frequency range of the electronic equipment and can severely damage and/or destroy the electronic equipment. A surge condition can arise in many different situations, however, typically arises when a lightning bolt strikes a component or transmission line which is coupled to the protected hardware and equipment. Lightning surges generally include D.C. electrical energy and AC electrical energy up to approximately 1 MHz in frequency. Lightning is a complex electromagnetic energy source having potentials estimated at from 5 million to 20 million volts and currents reaching thousands of amperes that can severely damage and/or destroy the electronic equipment.

Figure 1:
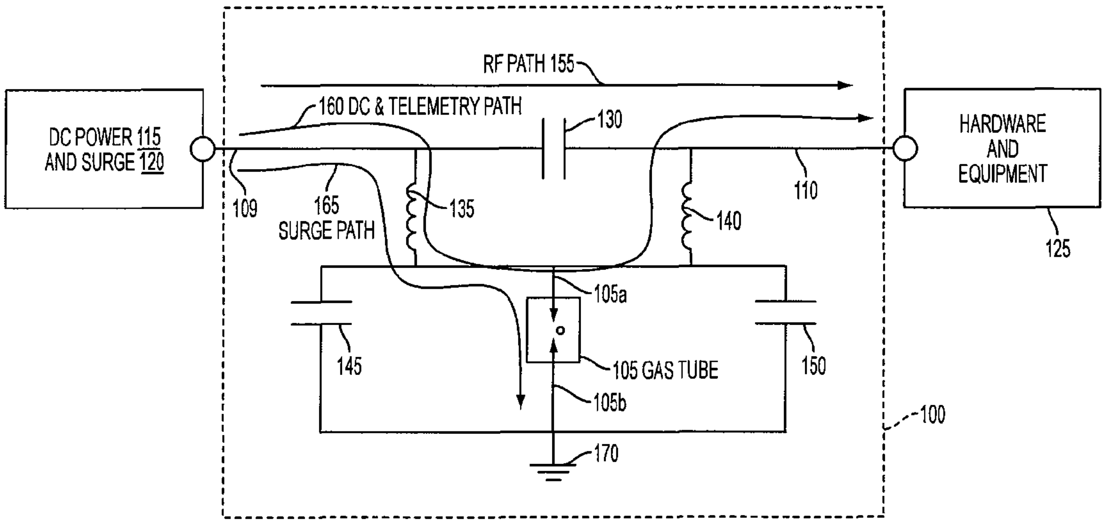
FIG. 1 is a schematic circuit diagram of a DC pass RF coaxial surge protector with a gas tube in accordance with various embodiments of the invention.
Figure 2:
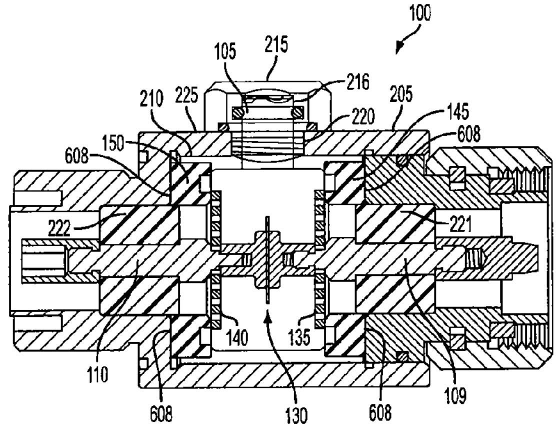
FIG. 2 is a cross-sectional view of a DC pass RF coaxial surge protector with a gas tube having the schematic circuit diagram shown in FIG. 1 in accordance with various embodiments of the invention.

FIG. 1 is a schematic circuit diagram of a DC pass RF coaxial surge protector 100 (also can be referred to as a surge suppressor) with a non-linear protection device 105 in accordance with various embodiments of the invention. FIG. 2 is a cross-sectional view of a DC pass RF coaxial surge protector 100 with a non-linear protection device 105 having the schematic circuit diagram shown in FIG. 1 in accordance with various embodiments of the invention. Referring to FIGS. 1 and 2, the surge protector 100 protects hardware and equipment 125 from an electrical surge 120 that can damage or destroy the hardware and equipment 125. The protected hardware and equipment 125 can be any communications equipment, cell towers, base stations, PC computers, servers, network components or equipment, network connectors, or any other type of surge sensitive electronic equipment. The surge protector 100 has various components each of which are structured to form the desired impedance, e.g., 50 ohms. The surge protector 100 has a housing 205 that defines a cavity 210. In one embodiment, the cavity 210 may be formed in the shape of a cylinder. The center conductors 109 and 110 are positioned concentric with and located in the cavity 210 of the housing 205.

Referring to FIG. 1, the surge protector 100 includes a RF path 155, a DC path 160 and a surge path 165. The RF path 155 includes an input center conductor 109, a capacitor 130 and an output center conductor 110. The frequency range of operation for the surge protector 100 is between about 698 MHz and about 2.5 GHz. In one embodiment, the frequency range of operation is 1.5 GHz to 2.5 GHz, within which the insertion loss is specified less than 0.1 dB and the VSWR is specified less than 1.1:1. In another embodiment, the frequency range of operation is 2.0 GHz to 5.0 GHz, within which the insertion loss is specified less than 0.2 dB and the VSWR is specified less than 1.2:1. The values produced above can vary depending on the frequency range, degree of surge protection, and RF performance desired. During normal operations, RF signals travel across the RF path 155 to the hardware and equipment 125. The protected hardware and equipment 125 receive and/or transmit RF signals along the RF path 155. Hence, the surge protector 100 can operate in a bidirectional manner.

The capacitor 130 is positioned in series with and positioned between the input and output center conductors 109 and 110. The capacitor 130 has a value of between about 3 picoFarads (pF) and about 15 pF, and preferably about 4.5 pF. The higher capacitance values allow for better lower frequency performance. The capacitor 130 is a capacitive device realized in either lumped or distributed form. Alternatively, the capacitor 130 can be parallel rods, coupling devices, conductive plates, or any other device or combination of elements which produce a capacitive effect. The capacitance of the capacitor 130 can vary depending on the frequency of operation desired by the user.

The capacitor 130 blocks the flow of direct current (DC) and permits the flow of alternating current (AC) depending on the capacitor's capacitance and the current frequency. At certain frequencies, the capacitor 130 might attenuate the AC signal. Typically, the capacitor 130 is placed in-line with the center conductors 109 and 110 to block the DC signal and undesirable surge transients.

DC power 115 may be supplied through the surge protector 100 to the hardware and equipment 125 via a DC path 160. In one embodiment, the DC path 160 includes the input center conductor 109, a first spiral coil or inductor 135, a second spiral coil or inductor 140, and the outer center conductor 110. The configuration of the DC path 160 causes the DC current to be forced or directed outside the RF path 155 around the capacitor 130. Hence, the DC current is moved off the center conductors 109 and 110 and the capacitor 130 and directed or diverted through the inductors 135 and 140 toward the non-linear protection device 105 (e.g., a gas tube). In one embodiment, the DC current and telemetry signals (e.g., 10-20 MHz telemetry signals) are directed or diverted along the DC path 160 and do not pass or travel across the capacitor 130.

During a surge condition, the surge 120 travels across or along the surge path 165 (i.e., across the input center conductor 109, the inductor 135, and the gas tube 105). Once the gas tube 105 discharges or breaks down, the surge 120 travels across the gas tube 105 to a ground 170 (e.g., the housing). The gas tube 105 is isolated from (i.e., is not directly connected to) the center conductors 109 and 110 by the first and second inductors 135 and 140. That is, the first and second inductors 135 and 140 prevent the gas tube 105 from being directly connected to the RF path 155.

The gas tube 105 contains hermetically sealed electrodes, which ionize gas during use. When the gas is ionized, the gas tube 105 becomes conductive and the breakdown voltage is lowered. The breakdown voltage varies and is dependent upon the rise time of the surge 120. Therefore, depending on the surge 120, several microseconds may elapse before the gas tube 105 becomes ionized, thus resulting in the leading portion of the surge 120 passing to the inductor 140. The gas tube 105 is coupled at a first end 105*a* to the first inductor 135 and at a second end 105*b* to ground 170, thus diverting the surge current to ground 170. The first end 105*a* of the gas tube 105 may also be connected to the second inductor 140. The gas tube 105 has a capacitance value of about 2 pF and a turn-on voltage of between about 90 volts and about 360 volts, and preferably about 180 volts to allow generous DC operating voltages.

The first and second spiral inductors 135 and 140 have small foot print designs and are formed as flat, planar designs. The first and second spiral inductors 135 and 140 have values of between about 10 nano-Henry (nH) and about 25 nH, and preferably between about 17-20 nH. The chosen values for the first and second spiral inductors 135 and 140 are important factors in determining the specific RF frequency ranges of operation for the surge protector 100. The diameter, surface area, thickness, and shape of the first and second spiral inductors 135 and 140 can be varied to adjust the operating frequencies and current handling capabilities of the surge protector 100. In one embodiment, an iterative process may be used to determine the diameter, surface area, thickness, and shape of the first and second spiral inductors 135 and 140 to meet the user's particular application. The diameter of the first and second spiral inductors 135 and 140 of this package size and frequency range is typically 0.865 inches. The thickness of the first and second spiral inductors 135 and 140 of this package size and frequency range is typically 0.062 inches. Furthermore, the spiral inductors 130 spiral in an outward direction.

The material composition of the first and second spiral inductors 135 and 140 is an important factor in determining the amount of charge that can be safely dissipated across the first and second spiral inductors 135 and 140. A high tensile strength material allows the first and second spiral inductors 135 and 140 to discharge or divert a greater amount of the current. In one embodiment, the first and second spiral inductors 135 and 140 are made of a 7075-T6 Aluminum material. Alternatively, any material having a good tensile strength and conductivity can be used to manufacture the first and second spiral inductors 135 and 140. Each of the components and the housing may be plated with a silver material or a tri-metal flash plating to improve Passive InterModulation (PIM) performance. This reduces or eliminates the number of dissimilar or different types of metal connections or components in the RF path to improve PIM performance.

The first and second spiral inductors 135 and 140 are disposed within the cavity 210. In one embodiment, each spiral inductor has an inner radius of approximately 62.5 mils and an outer radius of approximately 432.5 mils. An inner edge of each spiral inductor is coupled to the center conductor. An outer edge of each spiral inductor is coupled to the gas tube 105. The spiral inductors 135 and 140 may be of a particular known type such as the Archemedes, Logarithmic, or Hyperbolic spiral, or a combination of these spirals. The inner radius of the cavity 210 is approximately 432.5 mils. The housing 205 is coupled to a common ground connection to discharge the electrical energy.

The inner edge forms a radius of approximately 62.5 mils. The outer edge forms a radius of approximately 432.5 mils. Each spiral inductor spirals in an outward direction. In one embodiment, each spiral inductor has four spirals. The number of spirals and thickness of each spiral can be varied depending on the user's particular application.

During a surge condition, the electrical energy or surge current first reaches the inner edge of the first spiral inductor 135. The electrical energy is then dissipated through the spirals of the first spiral inductor 135 in an outward direction. Once the electrical energy reaches the outer edge of the first spiral inductor 135, the electrical energy is dissipated or diverted to ground 170 or to the housing 205 through the gas tube 105.

Figure 3:
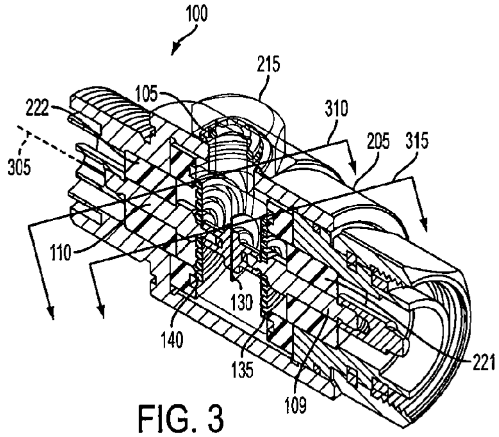
FIG. 3 is a perspective view of the DC pass RF coaxial surge protector of FIG. 2 partially showing the inside components in accordance with various embodiments of the invention.

Referring to FIGS. 2 and 3, the housing 205 may have an opening 220 that travels from a top surface 225 to the cavity 210. The opening 220 allows easy access into the cavity 210 of the housing 205 from outside the housing 205. The surge protector 100 also includes a removable cap 215 that is used to cover or seal the opening 220 in the housing 205. In one embodiment, the removable cap 215 has threads that mate with grooves in the housing 205 to allow the removable cap 215 to be screwed into the housing 205. The removable cap 215 allows a technician to unscrew or remove the removable cap 215 to easily inspect and/or replace the non-linear protection device 105. In one embodiment, the non-linear protection device 105 is partially positioned within the opening 220 and partially positioned within an interior open portion 216 of the removable cap 215. The non-linear protection device 105 is generally connected to the removable cap 215. The non-linear protection device 105 can be replaced with a short.

As shown in FIGS. 2 and 3, the input center conductor 109, the first inductor 135, the capacitor 130, the second inductor 140, a first tuning capacitor 145, a second tuning capacitor 150, and the output center conductor 110 are positioned within the cavity 210 of the housing 205. The input and output center conductors 109 and 110 are positioned along an axis 305. The first inductor 135 is positioned along a first plane 315 and the second inductor 140 is positioned along a second plane 310. The first plane 315 is positioned substantially parallel to the second plane 310. In one embodiment, the axis 305 is positioned substantially perpendicular to the first plane 315 and the second plane 310. The first tuning capacitor 145 and the second tuning capacitor 150 are positioned and sized to allow the technician to use various capacitors to allow for the adjustment and fine tuning of the RF frequencies passing across or through the surge protector 100. The first and second tuning capacitors 145 and 150 can each have a capacitance value of between about 20 pF and about 200 pF, and preferably about 150 pF. The first and second tuning capacitors 145 and 150 are formed using ring washers 608 of known insulating and dielectric properties. The ring washers 608 may be Kapton insulating ring washers or dielectric ring washers. A first ring washer 608 is positioned between the first capacitors 145 and the housing 205 and a second ring washer 608 is positioned between the second capacitor 150 and the housing 205. The first and second capacitors 145 and 150 serve as decoupling capacitors for tuning purposes while providing insulation for the DC circuit from the housing 205.

Disposed at various locations throughout the housing 205 are insulating members 221 and 222. The insulating members 221 and 222 electrically isolate the center conductors 109 and 110 from the housing 205. The insulating members 221 and 222 may be made of a dielectric material such Teflon which has a dielectric constant of approximately 2.3. The insulating members 221 and 222 are typically cylindrically shaped with a center hole for allowing passage of the center conductors 109 and 110.

Figure 4:
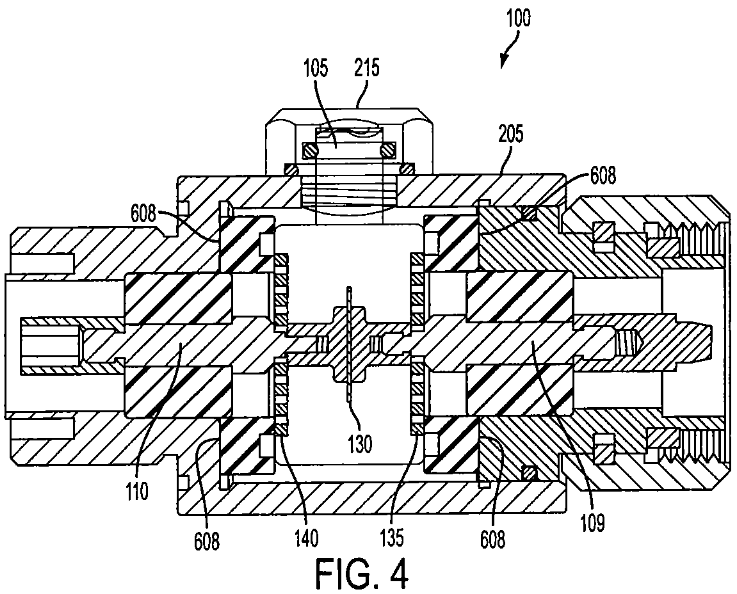
FIG. 4 is a cross-sectional view of the DC pass RF coaxial surge protector of FIG. 3 in accordance with various embodiments of the invention.

FIG. 4 is a cross-sectional view of the DC pass RF coaxial surge protector of FIG. 3 in accordance with various embodiments of the invention. During a surge condition, the electrical energy or surge current comes in on an outer shield of the center conductor 109 and is blocked by the capacitor 130. The electrical energy or surge current is then diverted through the spirals of the spiral inductor 135 and then to the non-linear protection device 105. The non-linear protection device 105 breaks down at a specified breakdown voltage, and then the electrical energy or surge current is diverted to the housing 205 or is grounded using the housing 205 or ground 170.

Figure 5A:
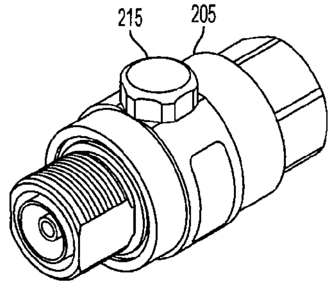
FIGS. 5A-5E are various exterior views of the DC pass RF coaxial surge protector of FIG. 2 in accordance with various embodiments of the invention.
Figure 5B:
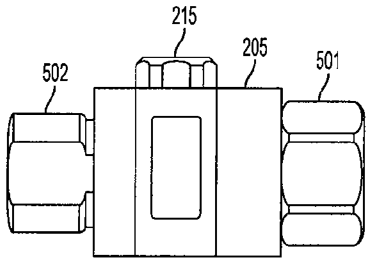
Figure 5D:
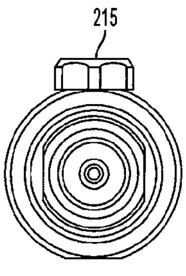
Figure 5C:
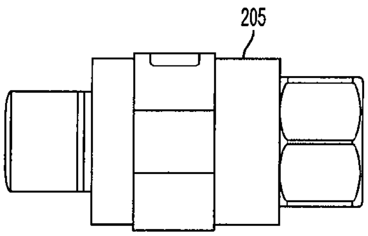
Figure 5E:
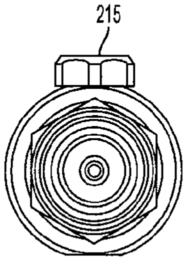

FIGS. 5A-5E are various exterior views of the DC pass RF coaxial surge protector 100 of FIG. 2 in accordance with various embodiments of the invention. Specifically, FIG. 5A is a perspective view of the housing 205 showing the removable cap 215, FIG. 5B is a front view of the housing 205 showing a male DIN connector 501 on one side of the housing 205 and a female DIN connector 502 on the other side of the housing 205, FIG. 5C is a rear view of the housing 205, FIG. 5D is a left end view of the housing 205 showing the female DIN connector 502, and FIG. 5E is a right end view of the housing 205 showing the male DIN connector 501.

Figure 6:
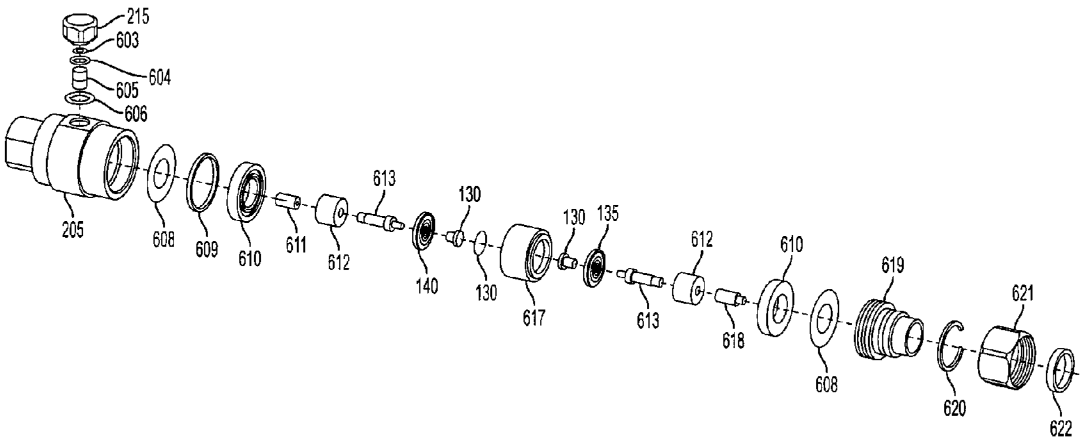
FIG. 6 is a disassembled perspective view of the DC pass RF coaxial surge protector of FIG. 4 in accordance with various embodiments of the invention.

FIG. 6 is a disassembled perspective view of the DC pass RF coaxial surge protector of FIG. 4 in accordance with various embodiments of the invention. Several components or parts are identified herein as examples. All components or parts may not be necessary to make the DC pass RF coaxial surge protector but are provided to illustrate exemplary components or parts list. The surge protector 100 may include the removable cap 215, a first washer 603, a first O-ring 604, a gas tube 605, a second O-ring 606, the housing 205, dielectric ring washers 608 (e.g., Kapton insulating ring washers), a third O-ring 609, cap washers 610, a DIN female contact 611, Teflon inserts 612, DIN extensions 613, the first inductor 135, the capacitor 130, the second inductor 140, a coil capture device 617, a DIN male contact 618, a DIN male end 619, a DIN male snap ring 620, a DIN male nut 621, and a fourth O-ring 622.

Figure 7:
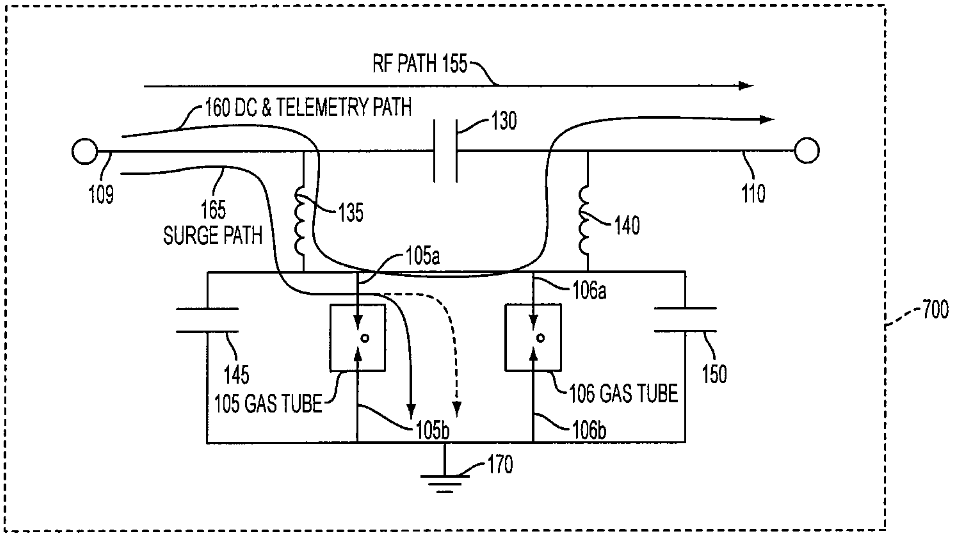
FIG. 7 is a schematic circuit diagram of a DC pass RF coaxial surge protector with two gas tubes in accordance with various embodiments of the invention.
Figure 8:
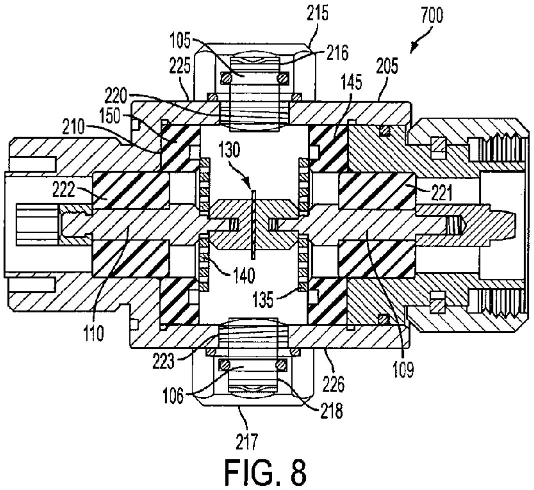
FIG. 8 is a cross-sectional view of a DC pass RF coaxial surge protector with two gas tubes having the schematic circuit diagram shown in FIG. 7 in accordance with various embodiments of the invention.
Figure 9:
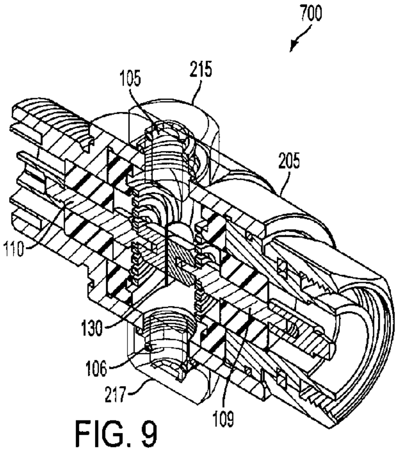
FIG. 9 is a perspective view of the DC pass RF coaxial surge protector of FIG. 8 partially showing the inside components in accordance with various embodiments of the invention.
Figure 10:
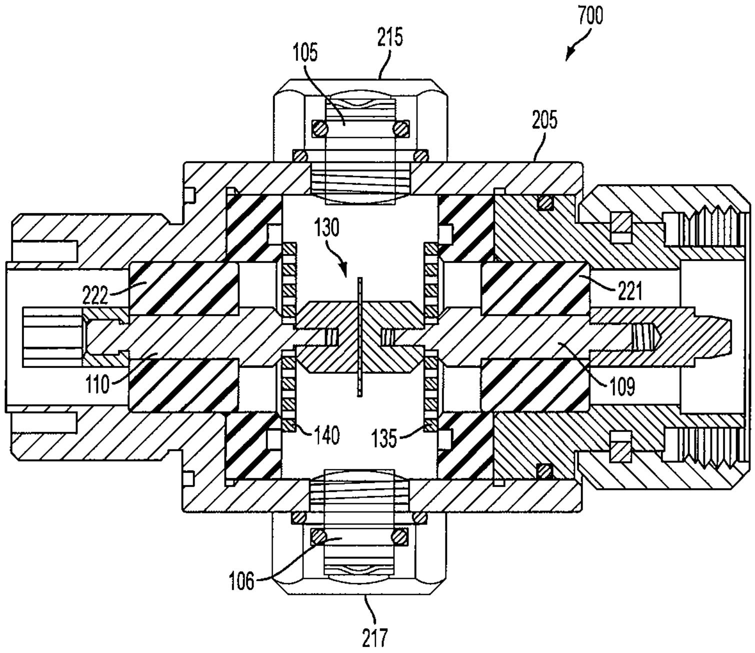
FIG. 10 is a cross-sectional view of the DC pass RF coaxial surge protector of FIG. 9 in accordance with various embodiments of the invention.
Figure 11A:
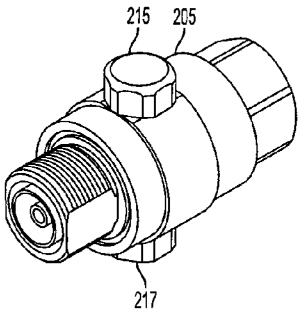
FIGS. 11A-11E are various exterior views of the DC pass RF coaxial surge protector of FIG. 8 in accordance with various embodiments of the invention.
Figure 11B:
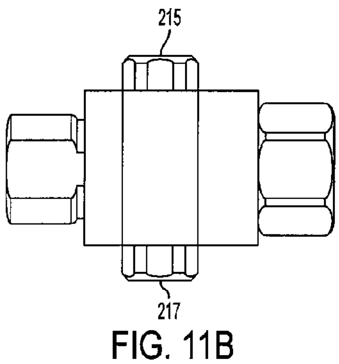
Figure 11C:
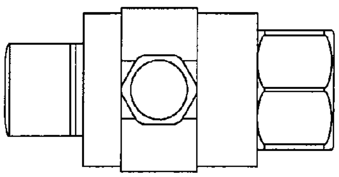
Figure 11D:
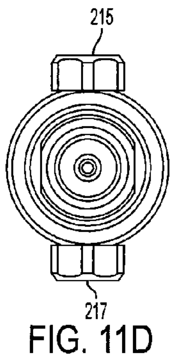
Figure 11E:
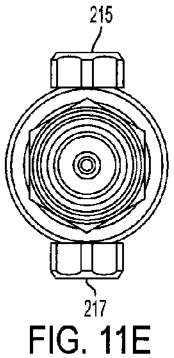

FIG. 7 is a schematic circuit diagram of a DC pass RF coaxial surge protector 700 with two non-linear protection devices 105 and 106 (e.g., gas tubes 105 and 106) in accordance with various embodiments of the invention. FIG. 8 is a cross-sectional view of the DC pass RF coaxial surge protector 700 with two gas tubes 105 and 106 having the schematic circuit diagram shown in FIG. 7 in accordance with various embodiments of the invention. FIG. 9 is a perspective view of the DC pass RF coaxial surge protector 700 of FIG. 8 partially showing the inside components in accordance with various embodiments of the invention. FIG. 10 is a cross-sectional view of the DC pass RF coaxial surge protector of FIG. 9 in accordance with various embodiments of the invention. FIGS. 7-10 are similar to FIGS. 1-4 with the addition of a second gas tube 106. In one embodiment, the second gas tube 106 may be used for redundancy purposes.

Referring to FIG. 7, during a surge condition, the surge travels across the surge path 165. The surge path 165 includes the first inductor 135 and the first gas tube 105 and/or the second gas tube 106. If the first gas tube 105 is unable to divert all the surge energy, the second gas tube 106 is used to divert a portion of or all of the surge energy. Also, the second gas tube 106 can be used for redundancy purposes if the first gas tube 105 malfunctions or has already been discharged due to a prior surge. Once the gas tubes 105 and 106 discharge, the surge travels across the gas tubes 105 and 106 to a ground 170 (e.g., the housing 205). The gas tubes 105 and 106 may have different turn-on voltages and therefore may discharge at different times. For example, the first gas tube 105 may have a turn-on voltage of about 120 volts while the second gas tube 106 may have a turn-on voltage of about 150 volts, and therefore the first gas tube 105 will breakdown at an earlier time than the second gas tube 106. Alternatively, the gas tubes 105 and 106 may have the same turn-on voltages. Each non-linear protection device 105 and 106 can be a gas tube, a metal oxide varistor (MOV), a diode, and combinations thereof.

Referring to FIGS. 8-10, the housing 205 may have a second opening 223 that travels from a bottom surface 226 to the cavity 210. The second opening 223 allows easy access into the cavity 210 of the housing 205. The surge protector 700 also includes a second removable cap 217 that is used to cover or seal the second opening 223 in the housing 205. In one embodiment, the non-linear protection device 106 (e.g., the second gas tube 106) is partially positioned within the second opening 223 and partially positioned within an interior open portion 218 of the second removable cap 217. In one embodiment, the second removable cap 217 has threads that mate with grooves in the housing 205. The second removable cap 217 allows a technician to unscrew or remove the second removable cap 217 to easily inspect and/or replace the non-linear protection device 106.

FIGS. 11A-11E are various exterior views of the DC pass RF coaxial surge protector 700 of FIG. 8 in accordance with various embodiments of the invention. Specifically, FIG. 5A is a perspective view of the housing 205 showing the removable cap 215, FIG. 5B is a front view of the housing 205 showing a male DIN connector 501 on one side of the housing 205 and a female DIN connector 502 on the other side of the housing 205, FIG. 5C is a rear view of the housing 205, FIG. 5D is a left end view of the housing 205 showing the female DIN connector 502, and FIG. 5E is a right end view of the housing 205 showing the male DIN connector 501.

Figure 12:
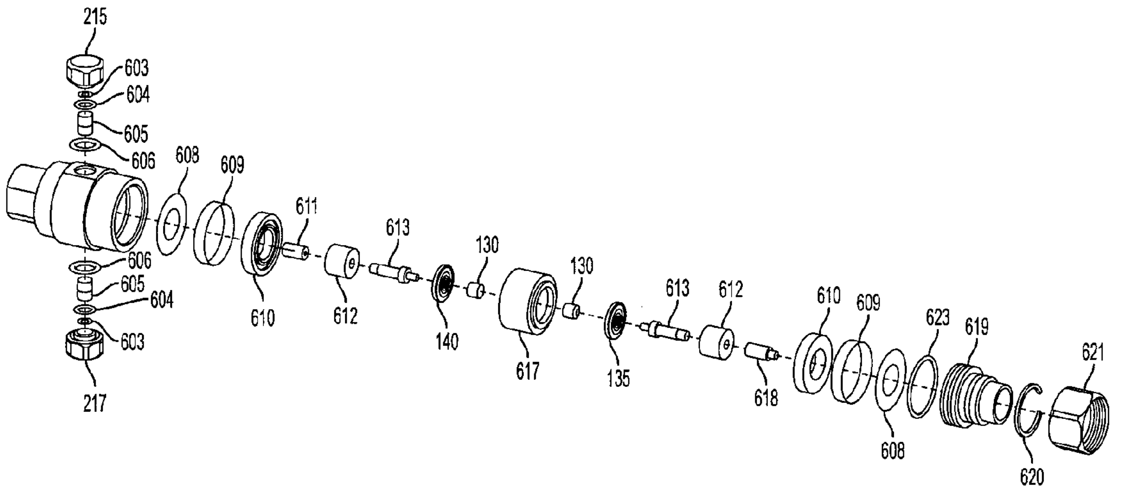
FIG. 12 is a disassembled perspective view of the DC pass RF coaxial surge protector of FIG. 10 in accordance with various embodiments of the invention.

FIG. 12 is a disassembled perspective view of the DC pass RF coaxial surge protector 700 of FIG. 10 in accordance with various embodiments of the invention. Several components or parts are identified herein as examples. All components or parts may not be necessary to make the DC pass RF coaxial surge protector but are provided to illustrate exemplary components or parts list. The surge protector 100 may include the removable cap 215, a first washer 603, a first O-ring 604, a gas tube 605, a second O-ring 606, the housing 205, ring washers 608, a third O-ring 609, cap washers 610, a DIN female contact 611, Teflon inserts 612, DIN extensions 613, the first inductor 135, the capacitor 130, the second inductor 140, a coil capture device 617, a DIN male contact 618, a DIN male end 619, a DIN male snap ring 620, a DIN male nut 621, and a fourth O-ring 622.

Figure 13:
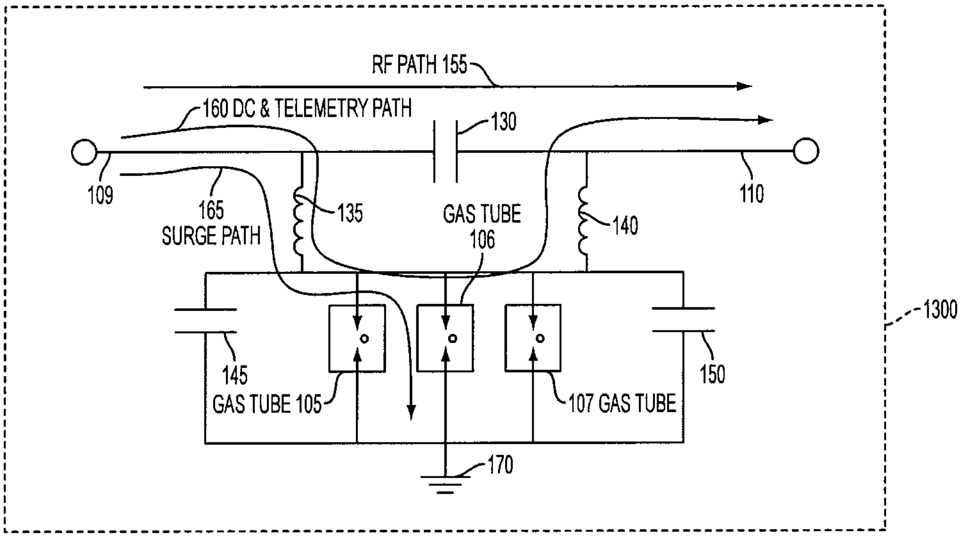
FIG. 13 is a schematic circuit diagram of a DC pass RF coaxial surge protector with three gas tubes in accordance with various embodiments of the invention.

FIG. 13 is a schematic circuit diagram of a DC pass RF coaxial surge protector 1300 with three gas tubes 105, 106 and 107 in accordance with various embodiments of the invention. During a surge condition, the surge travels across the surge path 165. The surge path 165 includes the first inductor 135 and the first gas tube 105, the second gas tube 106 and/or the third gas tube 107. If the first gas tube 105 is unable to divert all the surge energy, the second gas tube 106 and/or the third gas tube 107 may be used to divert a portion of or all of the surge energy. Also, the second gas tube 106 and the third gas tube 107 can be used for redundancy purposes if the first gas tube 105 malfunctions or has already been discharged due to a prior surge. Once the gas tubes 105, 106 and 107 discharge, the surge travels across the gas tubes 105, 106 and 107 to a ground 170 (e.g., the housing 205). The gas tubes 105, 106 and 107 may have different turn-on voltages and therefore may discharge at different times. Alternatively, the gas tubes 105, 106 and 107 may have the same turn-on voltages. Each non-linear protection device 105, 106 and 107 can be a gas tube, a metal oxide varistor (MOV), a diode, and combinations thereof.

Figure 14:
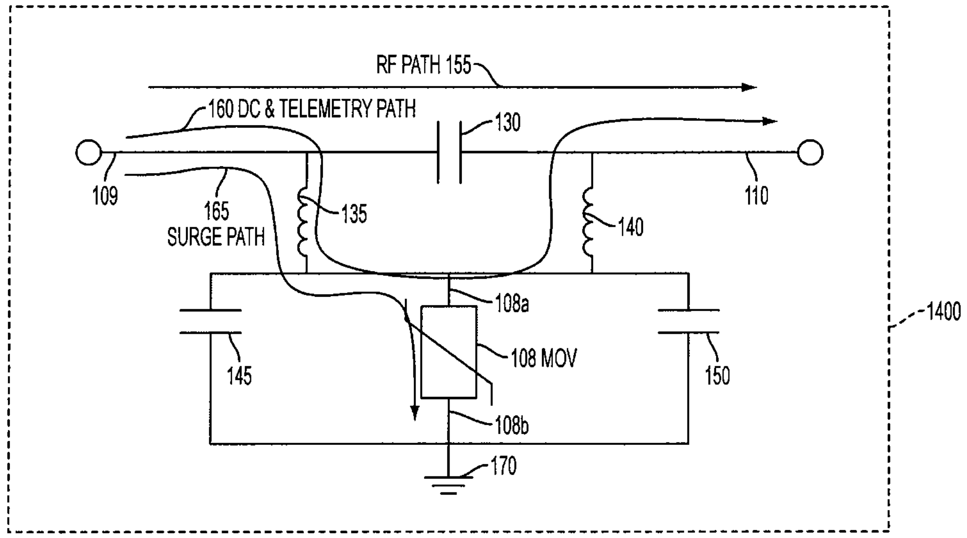
FIG. 14 is a schematic circuit diagram of a DC pass RF coaxial surge protector with a MOV in accordance with various embodiments of the invention.

FIG. 14 is a schematic circuit diagram of a DC pass RF coaxial surge protector 1400 with a MOV 108 in accordance with various embodiments of the invention. MOVs are typically utilized as voltage limiting elements. If the voltage at the MOV 108 is below its clamping or switching voltage, the MOV 108 exhibits a high resistance. If the voltage at the MOV 108 is above its clamping or switching voltage, the MOV 108 exhibits a low resistance. Hence, MOVs are sometimes referred to as non-linear resistors because of their non-linear current-voltage relationship. The MOV 108 is attached at one end 108*a* to the first inductor 135 and at another end 108*b* to the ground 170.

Figure 15:
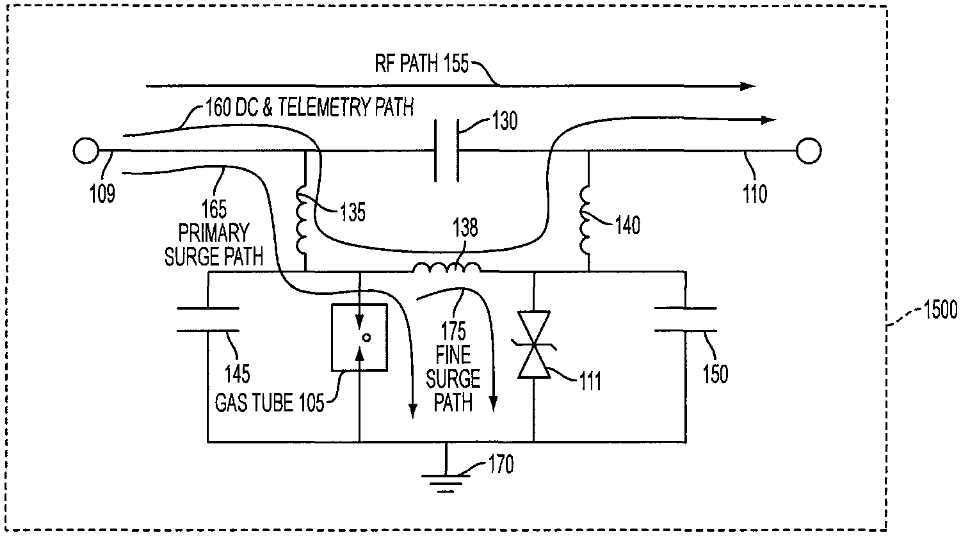
FIG. 15 is a schematic circuit diagram of a DC pass RF coaxial surge protector with a gas tube and a diode in accordance with various embodiments of the invention.

FIG. 15 is a schematic circuit diagram of a DC pass RF coaxial surge protector 1500 with a gas tube 105 and a diode 111 in accordance with various embodiments of the invention. During a surge condition, a primary surge path 165 includes the gas tube 105 and a fine surge path 175 includes the diode 111. The main part of the surge is passed across the gas tube 105 and any portion of the surge that is not diverted by the gas tube 105 is diverted to ground 170 by the diode 111.

Figure 16:
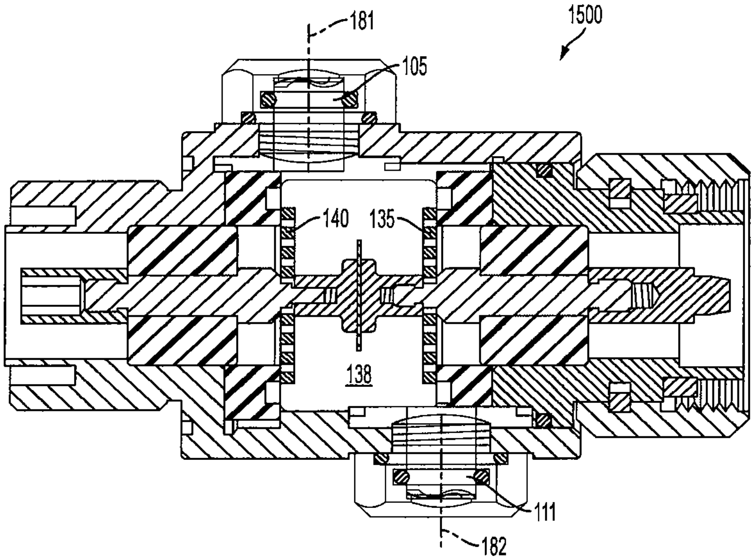
FIG. 16 is a cross-sectional view of the DC pass RF coaxial surge protector of FIG. 15 in accordance with various embodiments of the invention.

FIG. 16 is a cross-sectional view of the DC pass RF coaxial surge protector 1500 of FIG. 15 in accordance with various embodiments of the invention. As shown in FIG. 16, the gas tube 105 is positioned above the first inductor 135 along a first plane 181 and the diode 111 is positioned below the second inductor 140 along a second plane 182. In this embodiment, the location of the gas tube 105 is offset or staggered from the location of the diode 111 such that these two devices do not lie along the same vertical plane. Hence, the first plane 181 and the second plane 182 are substantially parallel to one another but are not concentric to one another. A portion 138 of the cavity 210 produces inductance.

Figure 17:
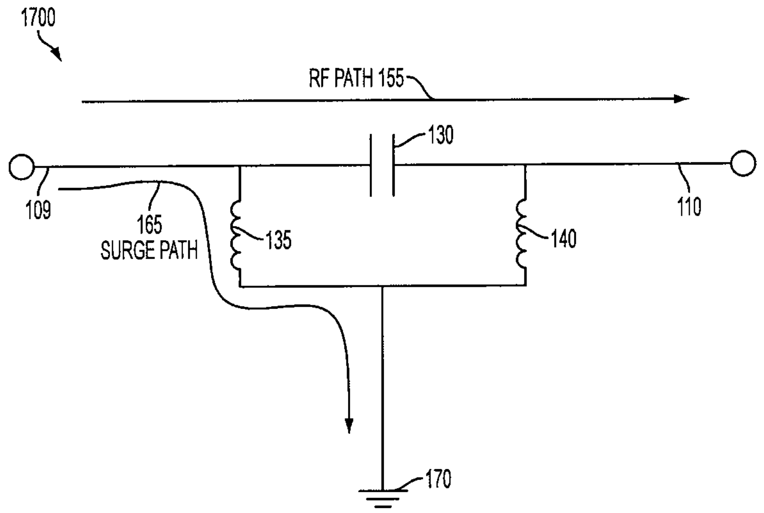
FIG. 17 is a schematic circuit diagram of a DC short RF coaxial surge protector that does not pass DC but rather shorts the DC to ground in accordance with various embodiments of the invention.

FIG. 17 is a schematic circuit diagram of a DC short RF coaxial surge protector 1700 that does not pass DC but rather shorts the DC to ground 170 in accordance with various embodiments of the invention. Hence, the outer edges of both the first and second spiral inductors 135 and 140 are connected to the ground 170 (e.g., the housing 205).

Figure 18:
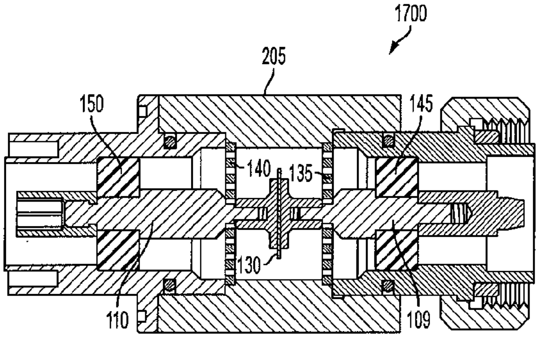
FIG. 18 is a cross-sectional view of a DC short RF coaxial surge protector having the schematic circuit diagram shown in FIG. 17 in accordance with various embodiments of the invention.
Figure 19:
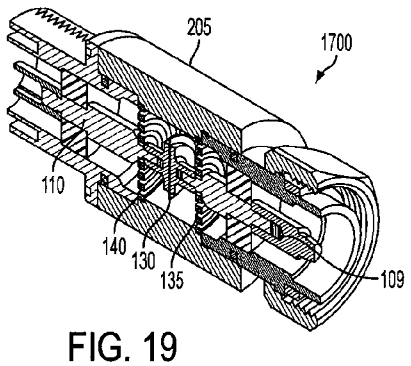
FIG. 19 is a perspective view of the DC short RF coaxial surge protector of FIG. 18 partially showing the inside components in accordance with various embodiments of the invention.
Figure 20:
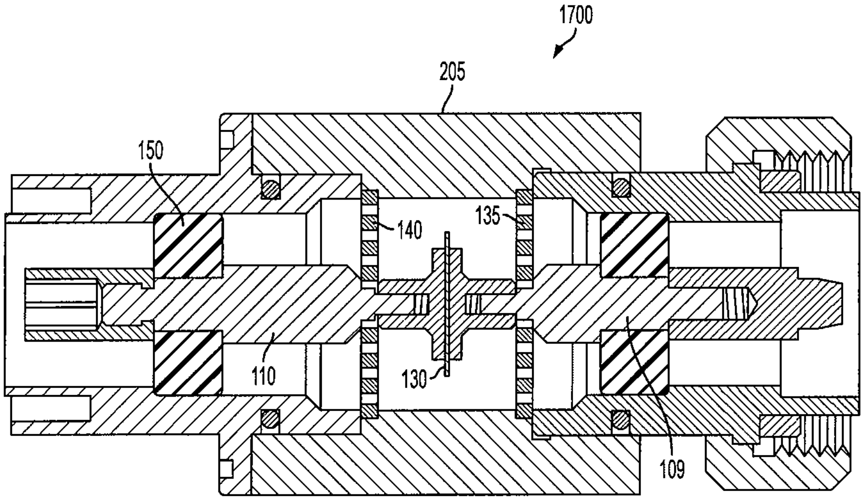
FIG. 20 is a cross-sectional view of the DC short RF coaxial surge protector of FIG. 19 in accordance with various embodiments of the invention.

FIG. 18 is a cross-sectional view of a DC short RF coaxial surge protector 1700 having the schematic circuit diagram shown in FIG. 17 in accordance with various embodiments of the invention. FIG. 19 is a perspective view of the DC short RF coaxial surge protector 1700 of FIG. 18 partially showing the inside components in accordance with various embodiments of the invention. FIG. 20 is a cross-sectional view of the DC short RF coaxial surge protector 1700 of FIG. 19 in accordance with various embodiments of the invention. As shown, the outer edges of both the first and second spiral inductors 135 and 140 are connected to the housing 205.

Figure 21:
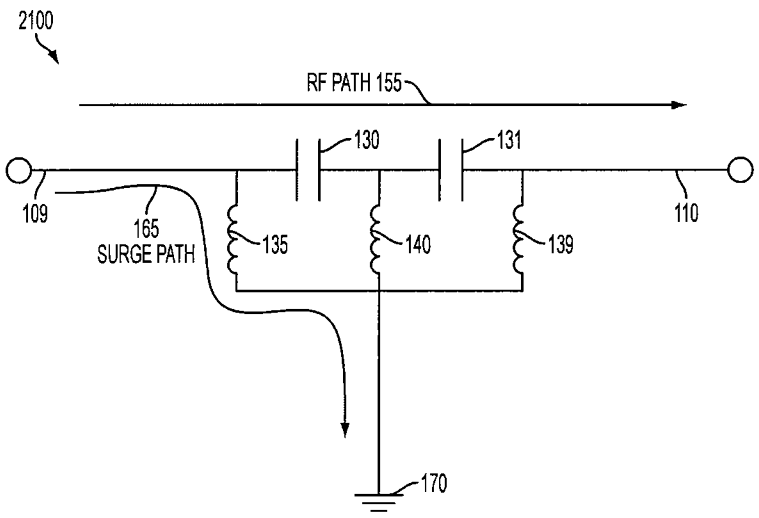
FIG. 21 is a schematic circuit diagram of a DC short RF coaxial surge protector that does not pass DC but rather shorts the DC to ground in accordance with various embodiments of the invention. Hence, the outer edges of the first, second and third spiral inductors are connected to the ground (e.g., the housing)

FIG. 21 is a schematic circuit diagram of a DC short RF coaxial surge protector 2100 that does not pass DC but rather shorts the DC to ground 170 in accordance with various embodiments of the invention. Hence, the outer edges of the first, second and third spiral inductors 135, 140 and 139 are connected to the ground 170 (e.g., the housing 205). The DC short RF coaxial surge protector 2300 is a 5-pole design. Providing the additional poles allows for better attenuation or filtering of low frequency signals without adversely affecting the RF performance. For example, the 5-pole design (FIG. 21) has better low frequency attenuation than the 3-pole design (FIG. 17). Similarly, the 7-pole design (FIG. 25) has better low frequency attenuation than the 5-pole design (FIG. 21). As examples, the 7-pole design has a −80 dB attenuation at approximately 100 MHz, the 5-pole design has −80 dB attenuation at approximately 55 MHz, and the 3-pole design has a −80 dB attenuation at approximately 30 MHz.

Figure 22:
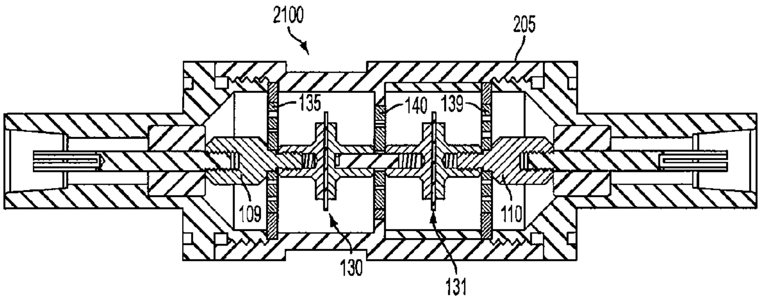
FIG. 22 is a cross-sectional view of a DC short RF coaxial surge protector having the schematic circuit diagram shown in FIG. 21 in accordance with various embodiments of the invention.
Figure 23:
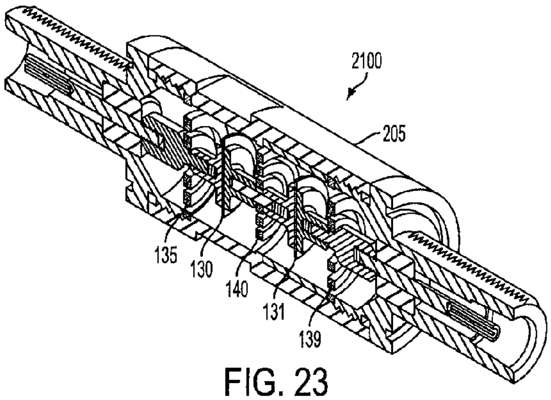
FIG. 23 is a perspective view of the DC short RF coaxial surge protector of FIG. 22 partially showing the inside components in accordance with various embodiments of the invention.
Figure 24:
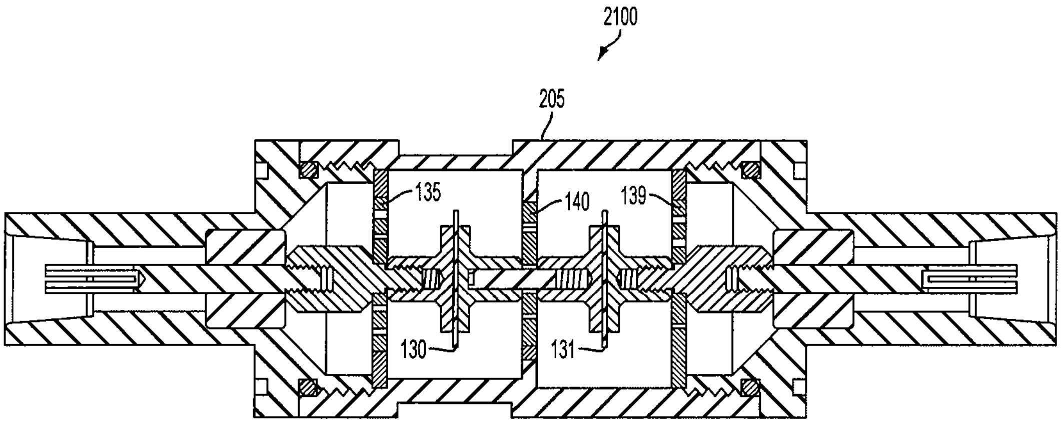
FIG. 24 is a cross-sectional view of the DC short RF coaxial surge protector of FIG. 22 in accordance with various embodiments of the invention.

FIG. 22 is a cross-sectional view of a DC short RF coaxial surge protector 2100 having the schematic circuit diagram shown in FIG. 21 in accordance with various embodiments of the invention. FIG. 23 is a perspective view of the DC short RF coaxial surge protector 2100 of FIG. 22 partially showing the inside components in accordance with various embodiments of the invention. FIG. 24 is a cross-sectional view of the DC short RF coaxial surge protector 2100 of FIG. 22 in accordance with various embodiments of the invention. As shown, the outer edges of the first, second and third spiral inductors 135, 140 and 139 are directly connected to the housing 205.

Figure 25:
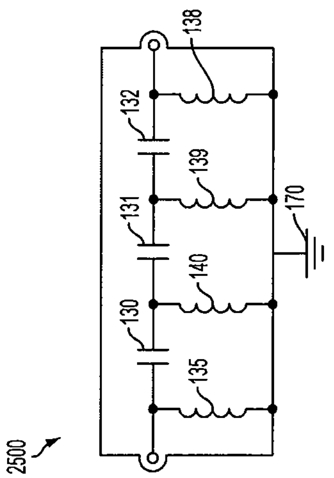
FIG. 25 is a schematic circuit diagram of a DC short RF coaxial surge protector that does not pass DC but rather shorts the DC to ground in accordance with various embodiments of the invention.
Figure 26:
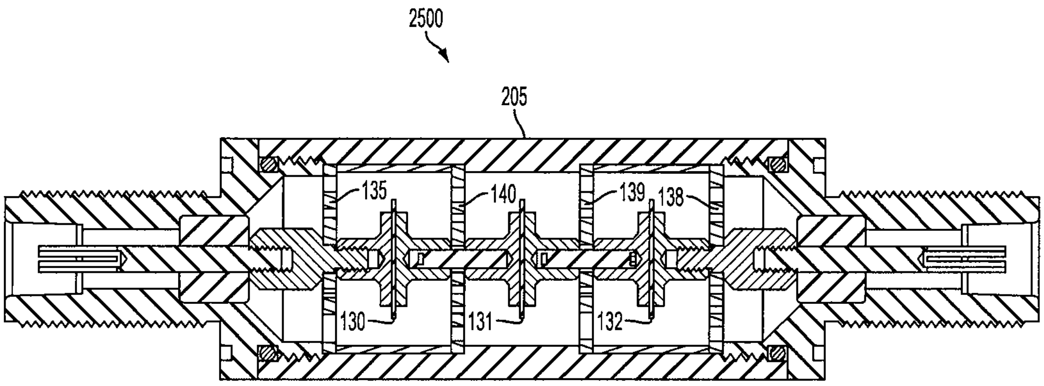
FIG. 26 is a cross-sectional view of a DC short RF coaxial surge protector having the schematic circuit diagram shown in FIG. 25 in accordance with various embodiments of the invention.
Figure 27:
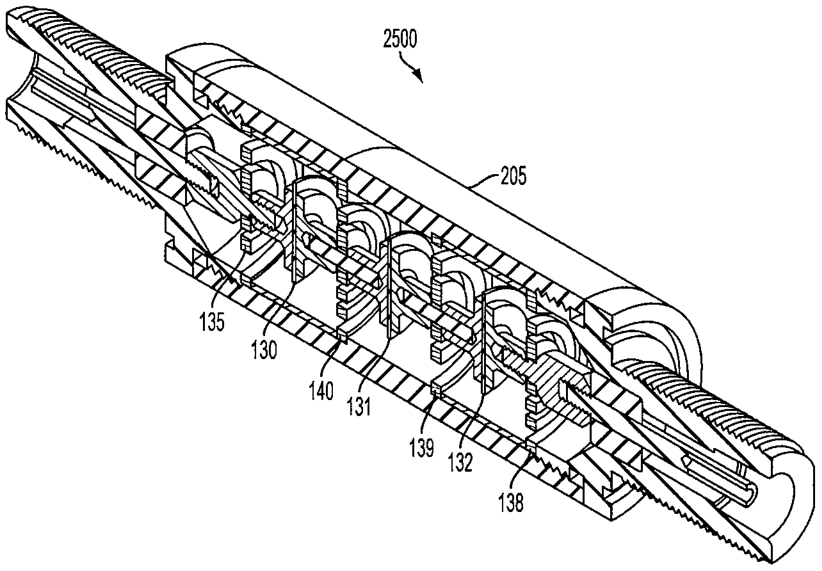
FIG. 27 is a perspective view of the DC short RF coaxial surge protector of FIG. 26 partially showing the inside components in accordance with various embodiments of the invention.
Figure 28:
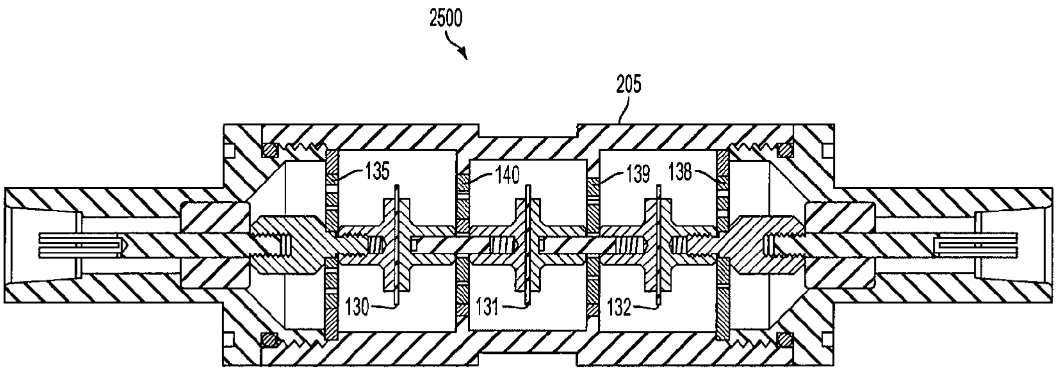
FIG. 28 is a cross-sectional view of the DC short RF coaxial surge protector of FIG. 26 in accordance with various embodiments of the invention.
Figure 29:
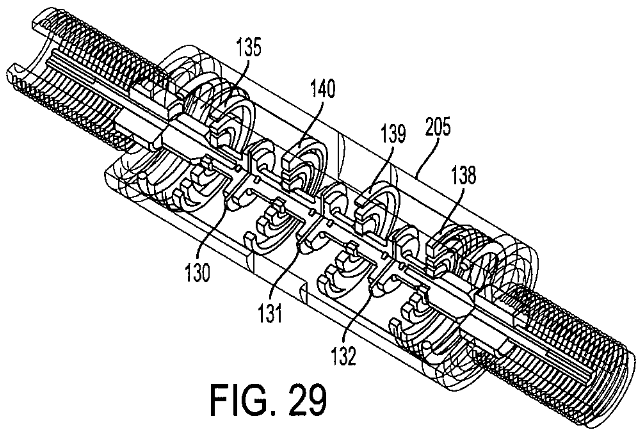
FIGS. 29 and 30 are 3-dimensional views of the DC short RF coaxial surge protector of FIG. 26 in accordance with various embodiments of the invention.
Figure 30:
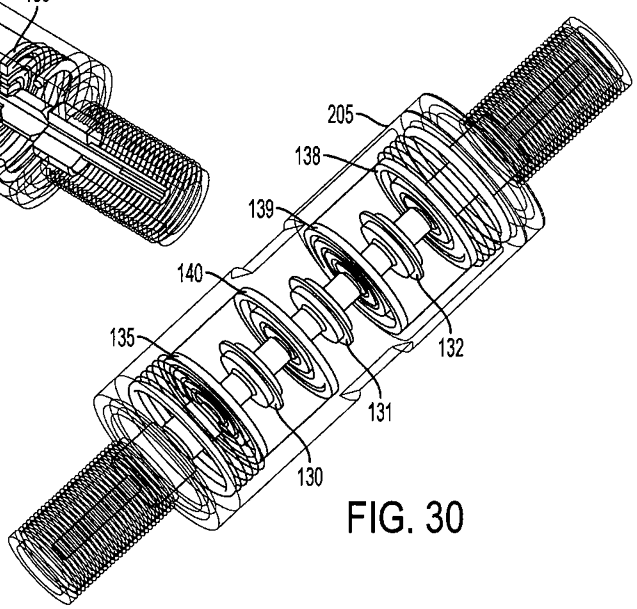

FIG. 25 is a schematic circuit diagram of a DC short RF coaxial surge protector 2500 that does not pass DC but rather shorts the DC to ground 170 in accordance with various embodiments of the invention. FIG. 26 is a cross-sectional view of a DC short RF coaxial surge protector 2500 having the schematic circuit diagram shown in FIG. 25 in accordance with various embodiments of the invention. FIG. 27 is a perspective view of the DC short RF coaxial surge protector 2500 of FIG. 26 partially showing the inside components in accordance with various embodiments of the invention. FIG. 28 is a cross-sectional view of the DC short RF coaxial surge protector 2500 of FIG. 26 in accordance with various embodiments of the invention. FIGS. 29 and 30 are 3-dimensional views of the DC short RF coaxial surge protector 2500 of FIG.

26 in accordance with various embodiments of the invention. As shown, the outer edges of the first, second, third and fourth spiral inductors 135, 140, 139 and 138 are directly connected to the housing 205.

Although the preferred embodiment is shown with particular capacitive devices, spiral inductors and gas tubes, it is not required that the exact elements described above be used in the present invention. Thus, the values of the capacitive devices, spiral inductors and gas tubes are to illustrate various embodiments and not to limit the present invention.

The present invention has now been explained with reference to specific embodiments. Other embodiments will be apparent to one of ordinary skill in the art. It is therefore not intended that this invention be limited, except as indicated by the appended claims.

What is claimed is:

1. A DC pass RF surge suppressor comprising:

a housing defining a chamber having a central axis, the housing having an opening to the chamber;

an input conductor disposed in the chamber of the housing and extending substantially along the central axis of the chamber;

an output conductor disposed in the chamber of the housing and extending substantially along the central axis of the chamber;

a non-linear protection device positioned in the opening of the housing for diverting surge energy to a ground;

a capacitor connected in series with the input conductor and the output conductor;

a first spiral inductor having an inner edge connected to the input conductor and an outer edge coupled to the non-linear protection device; and a second spiral inductor having an inner edge connected to the output conductor and an outer edge coupled to the non-linear protection device.

2. The DC pass RF surge suppressor of claim 1 wherein the first spiral inductor and the second spiral inductor are used to propagate DC energy from the input conductor to the output conductor.

3. The DC pass RF surge suppressor of claim 1 wherein the non-linear protection device is selected from a group consisting of a gas tube, a metal oxide varistor, a diode, and combinations thereof.

4. The DC pass RF surge suppressor of claim 1 further comprising a removable cap connectable to the housing for covering the opening in the housing.

5. The DC pass RF surge suppressor of claim 1 wherein the input conductor, the first spiral inductor, the second spiral inductor, and the output conductor form a DC path.

6. The DC pass RF surge suppressor of claim 5 wherein the DC path propagates DC currents and telemetry signals.

7. The DC pass RF surge suppressor of claim 1 further comprising a first tuning capacitor connected to the first spiral inductor and a first dielectric ring washer positioned between the first tuning capacitor and the housing.

8. The DC pass RF surge suppressor of claim 7 wherein the first tuning capacitor and the first dielectric ring washer are positioned within the chamber of the housing.

9. The DC pass RF surge suppressor of claim 7 further comprising a second tuning capacitor connected to the second spiral inductor and a second dielectric ring washer positioned between the second tuning capacitor and the housing.

10. The DC pass RF surge suppressor of claim 9 wherein the second tuning capacitor and the second dielectric ring washer are positioned within the chamber of the housing.

11. The DC pass RF surge suppressor of claim 9 wherein the first tuning capacitor and the second tuning capacitor serve as decoupling capacitors for tuning purposes and insulate DC currents from the housing.

12. A DC short RF surge suppressor comprising:

a housing defining a chamber having a central axis;

an input conductor disposed in the chamber of the housing and extending substantially along the central axis of the chamber;

an output conductor disposed in the chamber of the housing and extending substantially along the central axis of the chamber;

a capacitor connected in series with the input conductor and the output conductor;

a first spiral inductor having an inner edge connected to the input conductor and an outer edge coupled to the housing; and a second spiral inductor having an inner edge connected to the output conductor and an outer edge coupled to the housing.

13. The DC short RF surge suppressor of claim 12 wherein the first spiral inductor and the second spiral inductor are used to propagate DC energy to ground.

14. The DC short RF surge suppressor of claim 12 further comprising a first tuning capacitor connected to the first spiral inductor and a first dielectric ring washer positioned between the first tuning capacitor and the housing.

15. The DC short RF surge suppressor of claim 14 wherein the first tuning capacitor and the first dielectric ring washer are positioned within the chamber of the housing.

16. The DC short RF surge suppressor of claim 14 further comprising a second tuning capacitor connected to the second spiral inductor and a second dielectric ring washer positioned between the second tuning capacitor and the housing.

17. The DC short RF surge suppressor of claim 16 wherein the second tuning capacitor and the second dielectric ring washer are positioned within the chamber of the housing.

18. The DC short RF surge suppressor of claim 16 wherein the first tuning capacitor and the second tuning capacitor serve as decoupling capacitors for tuning purposes and insulate DC currents from the housing.

* * * * *